United States Patent [19]
Todt

[11] Patent Number: 5,705,566
[45] Date of Patent: Jan. 6, 1998

[54] ADHESIVE WITH ADDITIVE DELIVERY SYSTEM

[75] Inventor: Gregory L. Todt, Union, Mich.

[73] Assignee: Transhield Technology Co., LLC, Elkhart, Ind.

[21] Appl. No.: 699,395

[22] Filed: Aug. 19, 1996

Related U.S. Application Data

[63] Continuation-in-part of Ser. No. 525,275, Sep. 8, 1995.

[51] Int. Cl.[6] ............................ C09K 3/00; C23F 11/00
[52] U.S. Cl. ........................ 525/95; 252/387; 428/343
[58] Field of Search .............................. 428/40.1, 343, 428/355, 356; 252/387, 397; 524/176, 264, 398; 525/95; 427/207.1

[56] References Cited

U.S. PATENT DOCUMENTS

| | | | |
|---|---|---|---|
| 3,936,560 | 2/1976 | Santurri et al. | 428/35.2 X |
| 4,275,835 | 6/1981 | Milksic et al. | 428/343 X |
| 4,321,297 | 3/1982 | Adelman | 428/317.1 X |
| 4,584,225 | 4/1986 | Adelman | 428/354 X |
| 4,690,966 | 9/1987 | Rende, Jr. | 524/264 |
| 5,258,414 | 11/1993 | Bergishagen | 521/84.1 |
| 5,320,778 | 6/1994 | Milksic et al. | 428/461 X |
| 5,328,743 | 7/1994 | Wynne et al. | 428/105 |
| 5,491,017 | 2/1996 | Todt | 428/198 |

Primary Examiner—Daniel Zirker
Attorney, Agent, or Firm—Baker & Daniels

[57] ABSTRACT

An adhesive mixture includes a block copolymer hot melt adhesive and particles of a vapor corrosion inhibitor mixed therein to protect products against corrosion. The adhesive is used to seal flaps of containers together, secure carpet to the floor of a vehicle, secure nonwoven fabric to a shrink film so that the additive is released when the shrink film is shrunk around a product to be protected, or used as an adhesive on a tape, so that the product is protected when the tape is wrapped around the product.

11 Claims, 5 Drawing Sheets

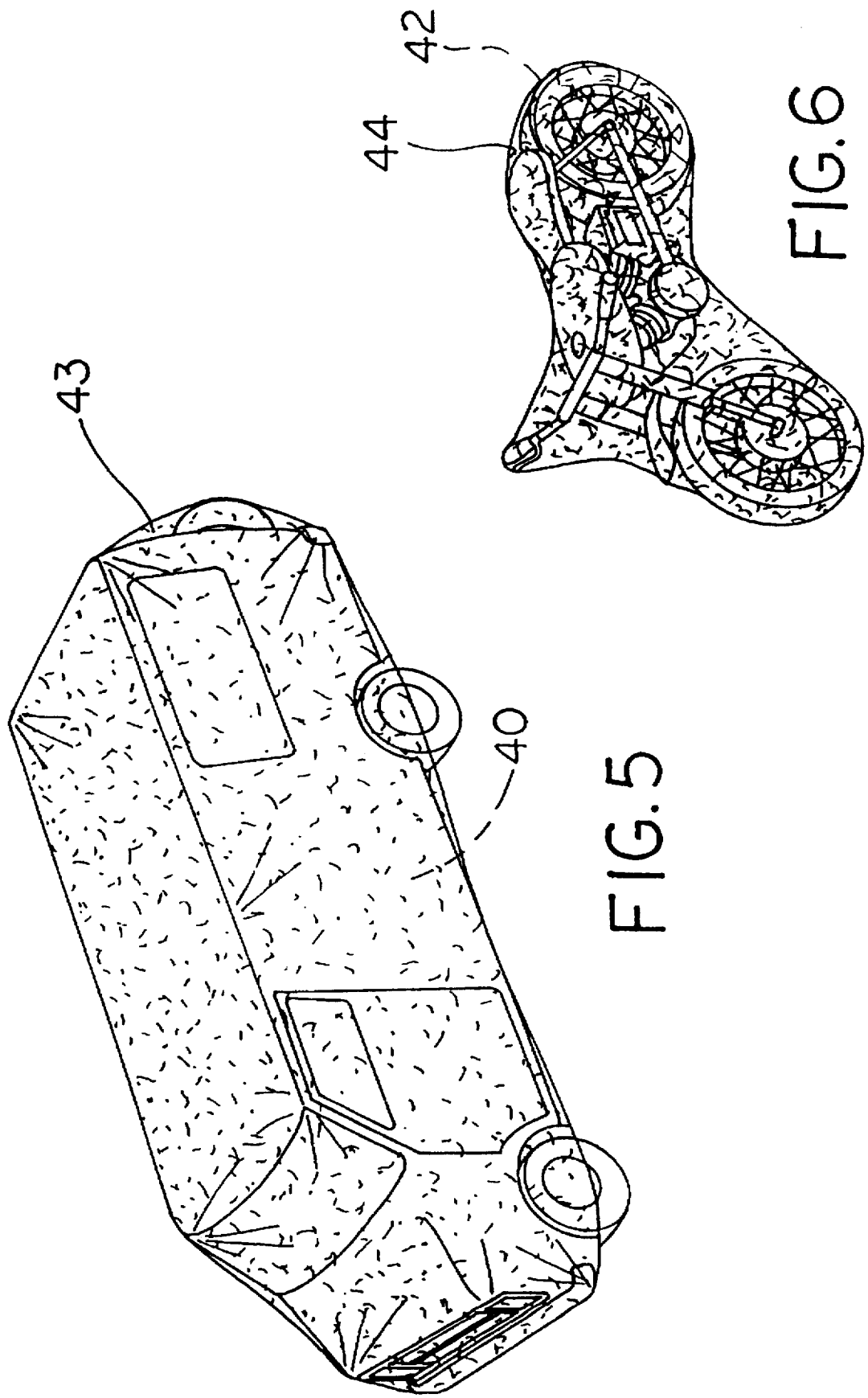

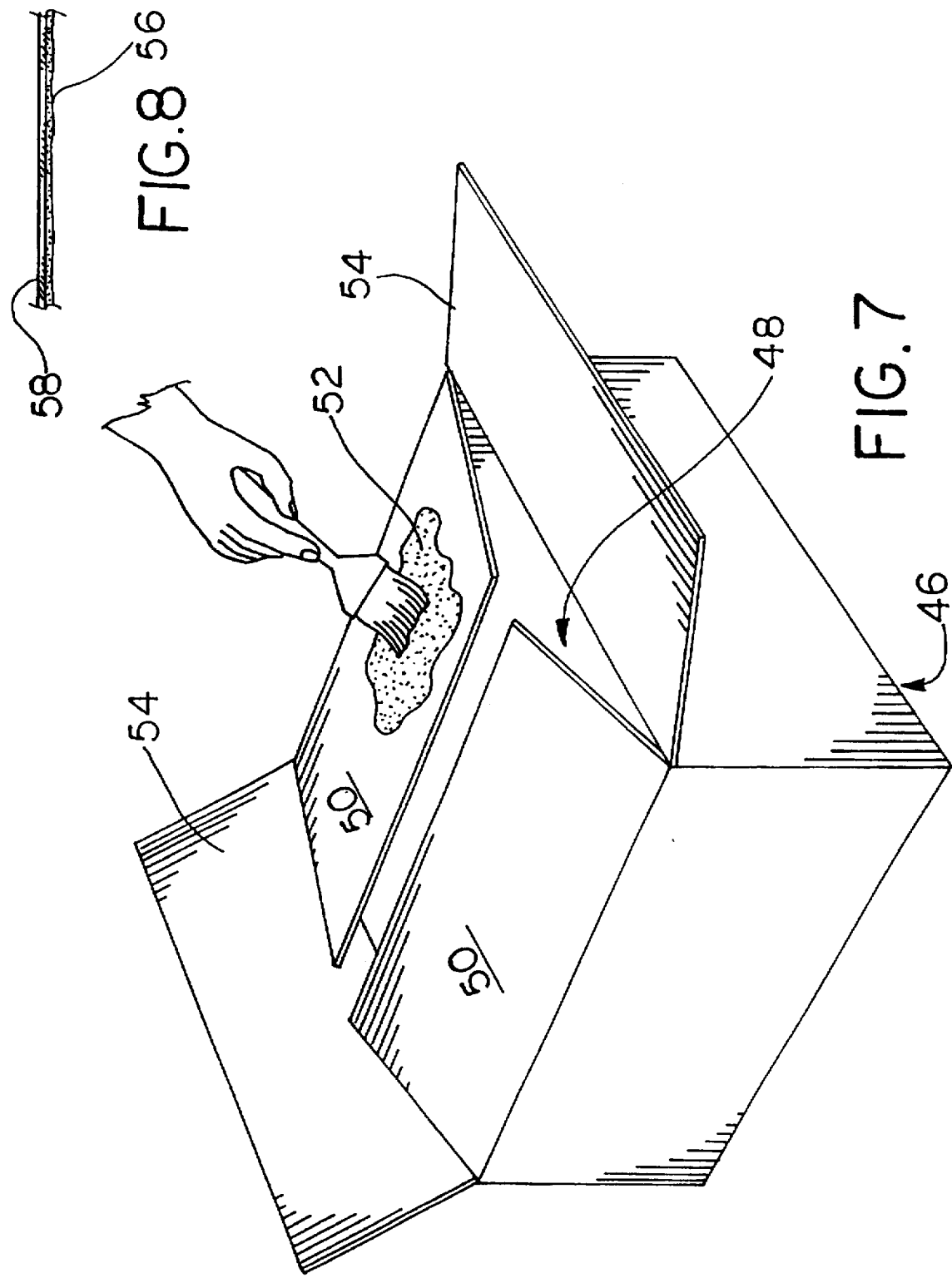

ADHESIVE WITH ADDITIVE DELIVERY SYSTEM

This is a continuation-in-part of U.S. patent application Ser. No. 08/525,275, filed Sep. 8, 1995, pending.

This invention relates to an adhesive containing a protective additive and a wrap material for wrapping products which uses the adhesive. The adhesive may include, for example, a vapor corrosion inhibitor (VCI) that reacts with moisture enclosed within the wrapping material to protect the products from corrosion. Corrosion is a major problem during the transportation and storage of manufactured articles after manufacture but before they are distributed to the ultimate consumer. Large articles, such as automobiles, vans and machinery and other similar equipment are particularly susceptible to corrosion, particularly if they are exported and are transported long distances in ocean going ships, where the atmosphere is particularly corrosive. In prior U.S. Pat. No. 5,491,017, a wrapping material is disclosed in which a shrink/stretch film outer layer is intermittently bonded to the surface of a nonwoven inner layer, and additives, such as corrosion inhibitors are added to the nonwoven layer. However, if the additive is in the nonwoven layer, the inhibitor is continuously emitted from the time that the nonwoven layer is manufactured. Since it is common for the nonwoven material to be stored for a period of time before use, the inhibitor may be depleted before the article is wrapped with the material. Furthermore, other types of product packaging may use an adhesive in which corrosion inhibitor may be included.

According to the present invention, an additive is added to the hot melt adhesive used to secure the nonwoven fabric to the shrink film. The additive releases a vapor into the package enclosed by the wrap material which mixes with the air enclosed within the package and any other vapors (such as moisture) in the cavity being protected. The moisture's presence, the vapor condenses on the surface of the product being protected and forms a thin, but highly effective, corrosion prohibiting layer or atmosphere. Should additional moisture enter the enclosed cavity, the vapor released by the additive forms it into a noncorrosive vapor. Furthermore, the shrink film outer layer acts as a barrier preventing emission of the inhibitor into the atmosphere. Accordingly, the packaging material according to the present invention is a "one way" emitter, in which all of the additive is used to treat the product used with the material, and the additive is not emitted into the ambient atmosphere.

In another embodiment of the invention, the adhesive mixed with additive may be used in packaging materials other than the aforementioned two layer shrink film/nonwoven material. For example, the adhesive may be used as an adhesive on a tape, which may be wrapped around articles to be protected, such that the additive carried by the tape is emitted to treat the article wrapped with the tape. For example, large manufactured objects, such as crankshafts and other machined parts, often have relatively small machined areas as compared to the overall size of the part. It is desirable to protect the machined areas from corrosion. Accordingly, the machined areas alone may be wrapped with tape using an adhesive carrying an additive such as a vapor corrosion inhibitor. The inhibitor included in the adhesive emits to protect the machined areas from corrosion. The tape is a flexible, impermeable material, so that the tape restricts the emission of the additive in a direction such that the additive is not emitted to the ambient atmosphere, and is only emitted from the adhesive to treat the section of the article for which protection is desired.

It is not necessary that a completely impermeable barrier be used with the adhesive disclosed according to the present invention. For example, adhesives are commonly used to secure carpets or other coverings to the floors and sides of motor vehicles. The metal parts beneath the carpet or covering are susceptible to corrosion. By using the adhesive according to the present invention, the vapor corrosion inhibitor mixed with the adhesive protects the floor or other metal panels. Although the carpeting that is secured by the adhesive may not be impermeable, it is at lease semi-impermeable to the additive, such that a much higher proportion of the additive is used to protect the metal panel than is emitted through the carpeting to the atmosphere. Similarly, the adhesive may be used to secure the flaps of boxes together. While the flaps of the boxes are not impermeable to the vapor released by the additive, the flaps will restrict emission of vapor into the atmosphere, thus confining the majority of the vapor to treatment of the product enclosed within the box container.

The additive may be any of a number of a well known additives, but an additive sold by Cortec Corporation, St. Paul, Minn., and identified as M-138 is preferred. This material is available in particulate form, and as long as the material is kept in a closed container, release of the material into the vapor form is minimal. In addition to vapor corrosion inhibitors, other materials which may be added to the adhesive layer and which form a protective or treating vapor in the cavity enclosed by the wrapping material include anti-stats (static electricity removers and dissipaters), antioxidants, antimicrobials (to protect the product from bacteria and other biological contaminants), acid neutralizers, acid or bases (to effect Ph changes), fragrances, additives which, when exposed to air, change color, thus indicating that the product has been tampered with, and others.

By placing the additive in the adhesive layer which adheres the nonwoven fabric to the film layer, costs are reduced because less additive will be required and handling and inventorying are simplified. If the additive were placed in the film layer, the additive releases in both directions (both into the cavity enclosed by the material and outwardly into the atmosphere), thus requiring a substantially greater quantity of additive. By including the additive in the adhesive layer, the film acts as a barrier, preventing release of the vapor into the atmosphere. In order to place the additive in the nonwoven, the nonwoven must be put through a bath, which changes the properties of the nonwoven fabric, and reduces its cushioning, softness, and other desirable properties. Furthermore, if the additive were placed in either the film layer or in the nonwoven layer, separate quantities of film or nonwoven would have to be maintained in inventory for each of the additives that are to be used, and the additive would release continually from the time that the film or nonwoven is made. However, by putting the additive in the adhesive layer, the additive material can be kept in a closed container, and thus be prevented from releasing into the vapor form, until it is to be used. The additive can be mixed with the adhesive in its molten form just before the adhesive is placed in a dispenser, or the adhesive can be dispensed directly onto the adhesive layer at a different dispensing station adjacent the dispensing station through which the adhesive is dispensed onto the nonwoven layer. On the other hand, the adhesive can also be mixed with the additive when the adhesive is made and formed into block form prior to use. Since the additive will be encapsulated by the adhesive, release is minimized. By either dispensing the additive by separate station or mixing it with the adhesive just as the molten adhesive is placed in the dispenser, changing additive is effected almost immediately so that production interruptions are minimized.

These and other advantages of the present invention will become apparent from the following description with reference to the accompanying drawings in which:

FIGS. 5 and 6 are views in perspective of a conversion van and a motorcycle respectively which have been wrapped with a material made pursuant to the present invention; and FIG. 7 is a view in perspective of a box container which utilizes the present invention to protect products contained therein.

FIG. 8 shows a cross view of the adhesive layer applied to one side of a film.

Figure 1:
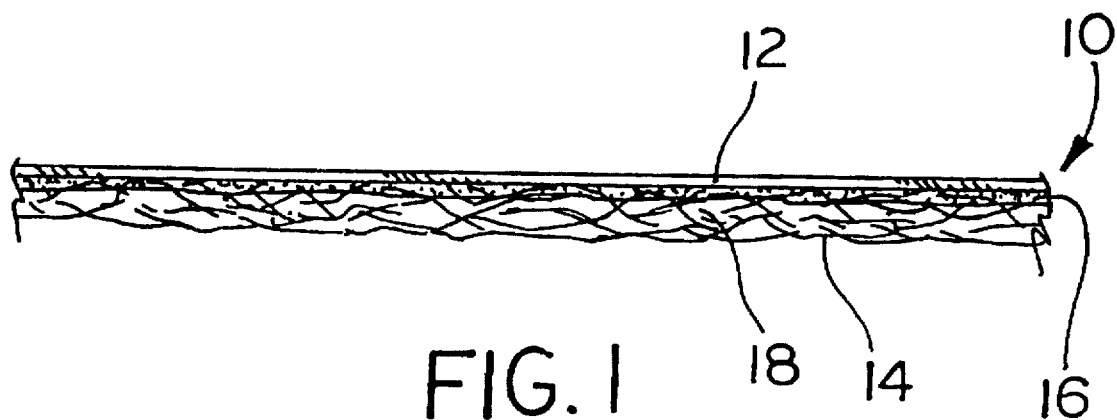
FIG. 1 is a cross-sectional view taken through the wrapping material according to the present invention before the material is shrunk around an article.
Figure 2:
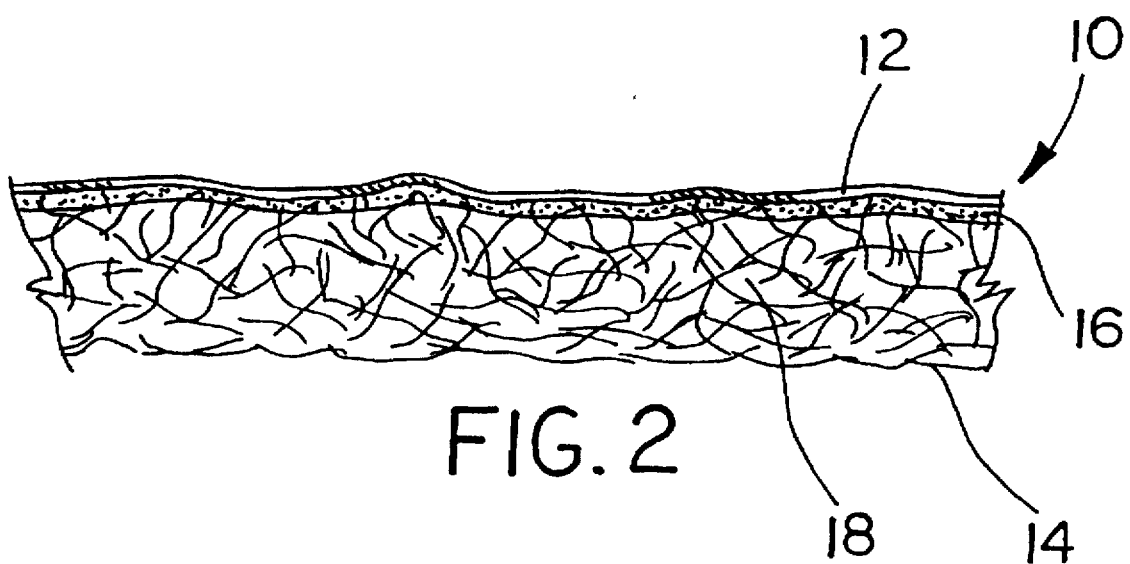
FIG. 2 is a cross-sectional view similar to FIG. 1 but illustrating the wrapping material according to the present invention after it is shrunk around an article.

Referring now to FIGS. 1 and 2 of the drawings, a shrink wrap material generally indicated by the numeral 10 made according to the present invention includes a layer 12 consisting of a shrinkable, stretchable film which has a predetermined shrink response in response to heat applied to the film. A second layer 14 is secured to the layer 12 by an adhesive layer generally indicated by the numeral 16. Layer 14 is a nonwoven fabric comprising nonwoven, randomly arranged fibers. The first layer 12 may be of any known type of a shrinkable, stretchable film well known to those skilled in the art, but is preferably a polyolefin in the ethylene vinyl acetate copolymer. However, other shrink wrap films may be used. The nonwoven fabric 14 may be of any well known type, and may include both natural and manmade fibers, or combinations thereof, such as polyester, nylon 6,6 or a combination of wood pulp and polyester fibers. Typical fabrics are sold by the Dupont Corporation under the trademark SANTARA or by Fiberweb North American identified as Fabric PBN-2. The nonwoven fabric may be spun bonded. It will be noted that the fibers forming the nonwoven fabric 14 cooperate to define voids 18.

The adhesive 16 is preferably a hot melt adhesive in the block copolymer family. According to the invention, an additive is dispersed throughout the adhesive layer 16. The additive is preferably in particulated form, and may be, for example, a vapor corrosion inhibitor (VCI) sold by Cortec Corporation of St. Paul, Minn. under the designation M-138. This material, when exposed to the moisture in the air, vaporizes to provide a corrosion resisting atmosphere by combining with the moisture in the air, as will hereinafter be described. During manufacture of the adhesive, it is desirable to reduce the size of the VCI particles to a maximum dimension of less than about 30 microns. The increased surface area contained within the increased number of smaller particles permits emission of the vapor in a more effective manner. The particles automatically "shut down" after a period of time (about two years), even though some of the additive is still available. By increasing the available surface area, a much greater percentage of the additive can be emitted. However, normal processing to reduce the particle size to break the particles apart cannot be used, because if the additive is exposed to atmosphere, the additive combines with the atmosphere as described above. Accordingly, particles size is reduced by placing the particles in a chamber and reducing the temperature in the chamber to about −50° F. The humidity of the air inside the chamber at this temperature is effectively zero. The particles are then pulverized by impacting the particles upon themselves forcing the particles through jets in a manner well known to those skilled in the art. The particles collide with themselves, thereby fractioning the particles. The particles are "classified out" of the chamber in a manner well known to those skilled in the art such that the maximum particle size of the particles will be about 30 microns. The jet impaction continues until all of the particles in the chamber have been reduced to this size. In addition to increasing the surface area of the particles and therefore making more of the additive available as discussed above, the reduced particle size also facilitates dispensing of the adhesive and additive mixture though nozzles as explained herein with regard to FIG. 4.

The adhesive mixture is compounded by mixing thermoplastic rubber particles, tackifiers, plasticizers and mineral oil together, cooking down the mixture in a manner well known to those skilled in the art, and then pouring the mixture in a block mold. The fractionalized VCI particles may be mixed in directly with the other ingredients as the mixture is being heated or by being drawn into the mineral oil before the mineral oil is mixed with the other ingredients. Typically, the VCI comprises from about 5% to about 20% by weight of the mixture. The other ingredients are mixed in proportion well known to those skilled in the art, which can vary according to the properties of the adhesive that are desired.

Figure 3:
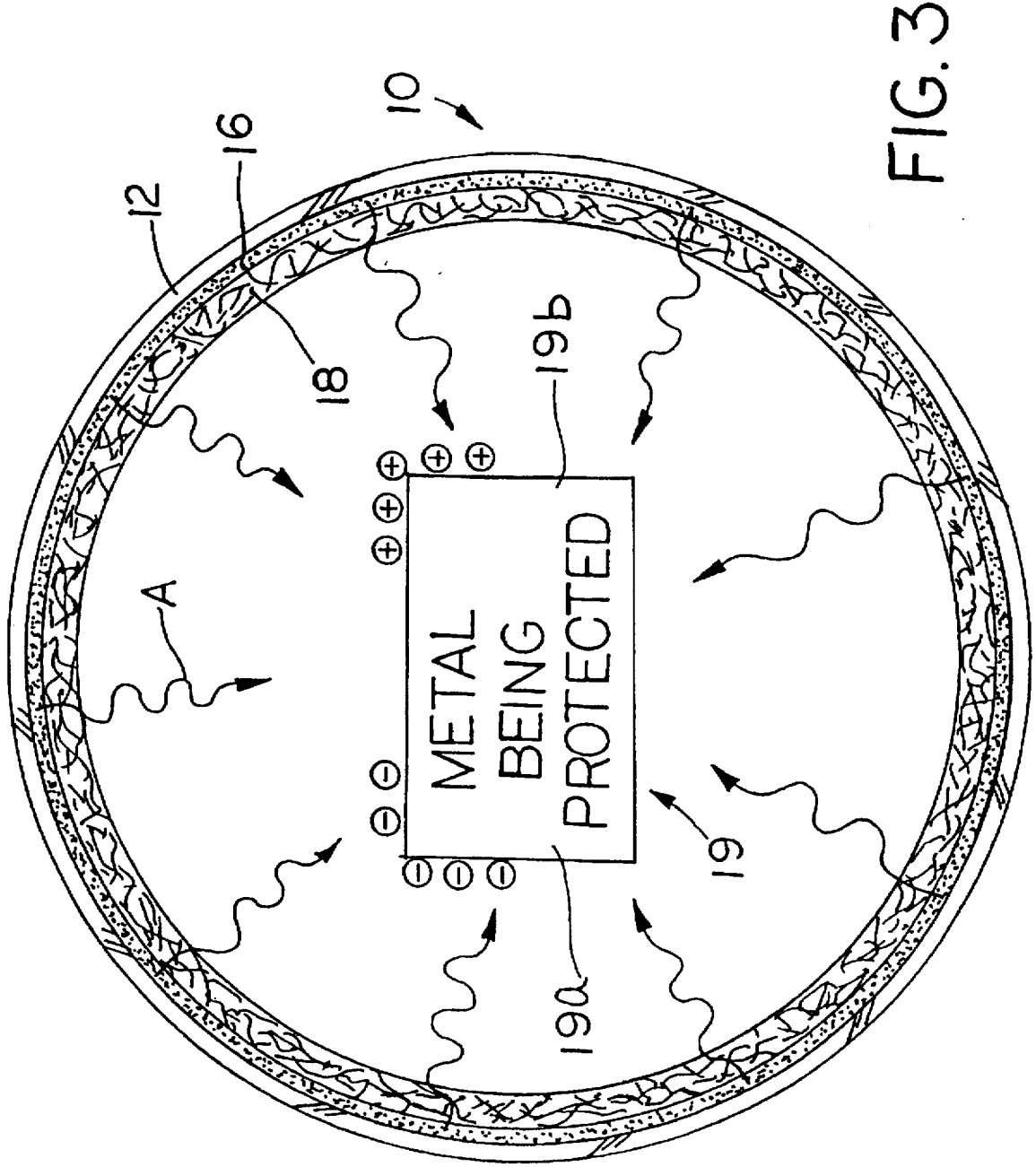
FIG. 3 is a view similar to FIG. 2, but illustrating the manner in which the present invention inhibits corrosion of products wrapped with the wrapping material of FIGS. 1 and 2.

The thickness of the adhesive layer 16 has been exaggerated in FIGS. 1–3 for clarity. Preferably, the nonwoven layer 14 has an irregular surface, and the adhesive adheres only to the raised portions of the surface to the film 12. This permits nonwoven layer 14 to aerate during shrinking, as the air entrained in the voids 18 expands, so that, after shrinking, as illustrated in FIG. 2, the nonwoven layer has expanded to provide additional cushioning.

Referring to FIG. 3, the article 19 wrapped by the material 10 divides itself into anodic regions 19a (carrying a negative charge as indicated in FIG. 3) and a cathodic region 19b (carrying a positive charge as indicated in FIG. 3). Rust and corrosion occurs as moisture entrained with the volume enclosed by the wrapping material transfers charges between these regions. The film layer 12 acts as a barrier preventing the vapor corrosion inhibitor (VCI) within the adhesive 16 from emitting to atmosphere. Accordingly, the VCI is emitted inwardly as indicated by the arrows A. The fact that the material 10 acts as a "one way emitter" conserves the VCI additive, and assures that it will only be used to protect the product 19. As also discussed above, the material 10 is shrunk around the products by applying heat, thereby causing the shrink/stretch film to shrink around the product, but the nonwoven layer 18 acts as a cushion between the films and the product to prevent the product from being damaged due to contact with the shrink/stretch film 12. When the material 10 is being shrank around the product, the product is extremely vulnerable and most corrosion that occurs will occur when the product is initially wrapped and the humidity level within the wrapping is highest. The VCI additive is activated by humidity, acidity, and heat. Since the material 10 is shrunk around the product using heat, the VCI is initially heated upon wrapping. Accordingly, a very high does of VCI is emitted during the wrapping by the heat applied to shrink the material around the product. This very high dose of inhibitor counteracts the moisture within the material. The VCI condenses on the product 19, and combines with the moisture to form a corrosion preventive salt which protects the material. Accordingly, after the moisture within the package is counteracted by the VCI, a molecular protective film is formed on all of the metal surfaces. The VCI within the adhesive 16 continues to emit after the initial high dose, but at a lesser level, for a limited period of time, which may be as much as two years. Accordingly, moisture within the package is continually counteracted by the VCI.

As discussed above, the additive can be added to the adhesive when the adhesive is made, and will be contained within the block of adhesive. When the adhesive is melted to be used, the additive is first exposed to atmosphere and thus very little of the additive occurs before the adhesive is used. The additive may also be added to the adhesive after the adhesive is melted. The additive and the adhesive are mixed together and then placed in a dispenser as will hereinafter be described for dispensing the adhesive onto the nonwoven fabric 14. Again, the additive is kept in sealed containers before being added to the adhesive, so that very little of the additive is wasted before it is used. Finally, the additive can be dispensed directly onto the nonwoven material 14 at a station adjacent to, but separate from, the station dispensing the adhesive onto the nonwoven material. In any event, the additive is not exposed to air or moisture before it is used. Furthermore, changing the type of additive is relatively simple. If the additive were added to either the film or the nonwoven material, large quantities of these layers would have to be stocked in inventory so that the material containing the proper additive would be available. By mixing with the adhesive during application of the adhesive to the batt or just before the adhesive is applied to the batt, maximum flexibility is permitted.

Figure 4:
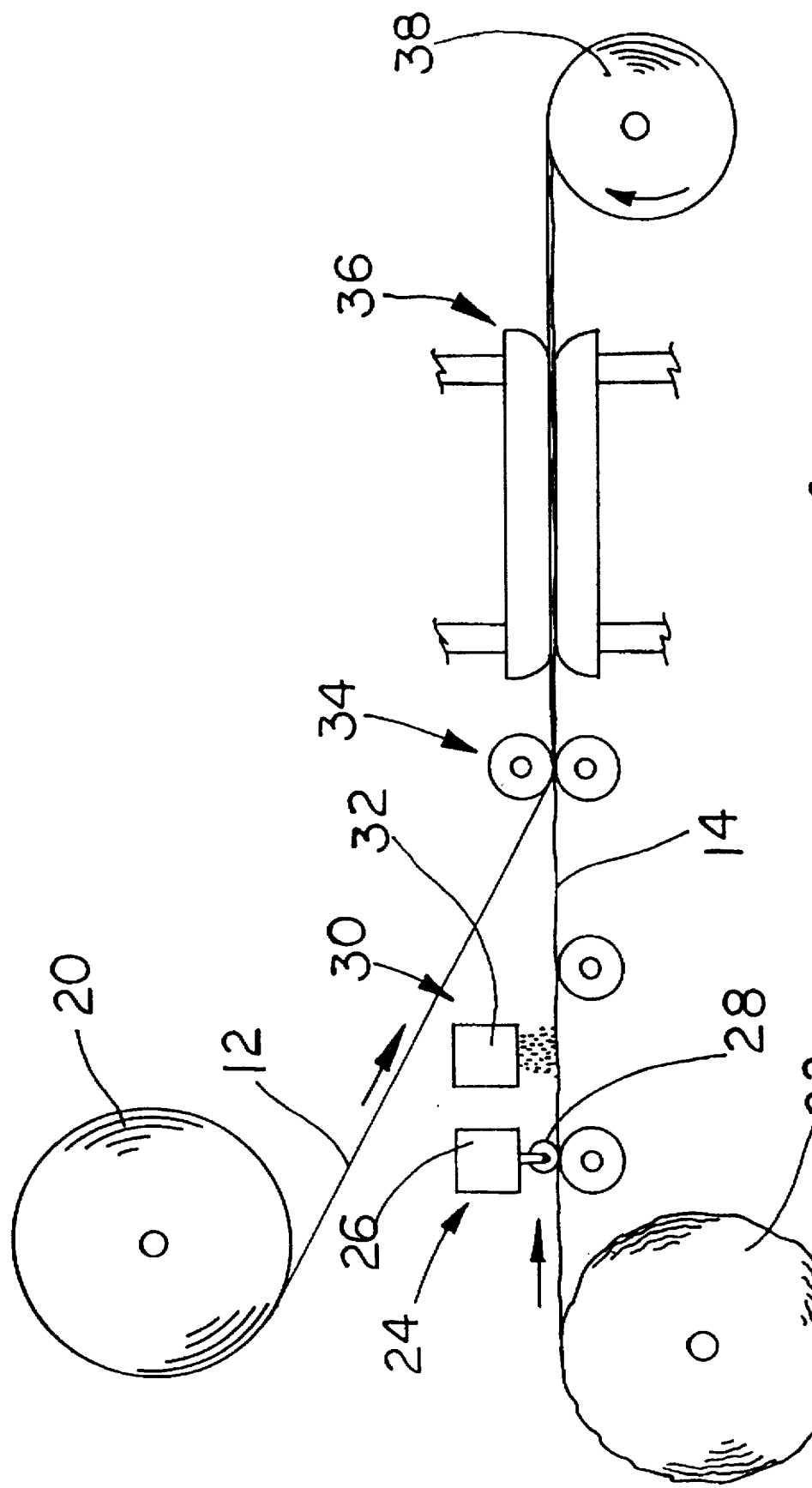
FIG. 4 is a schematic illustration of the manner in which the wrapping material according to the present invention is manufactured.

Referring now to FIG. 4, the film 12 is fed from a roll 20 and the nonwoven fabric 14 is fed from a roll 22. The fabric 14 is fed through a gluing station 24 which the aforementioned hot melt adhesive is stored in a reservoir 26 and lightly applied to the upper surface of the fabric 14 by dispensing roller 28, in a manner well known to those skilled in the art. If the aforementioned additive has not been mixed with the hot melt adhesive before it is placed in the reservoir 26, the additive is spread from a station generally indicated by the numeral 30 onto the upper surface of the fabric 14 at about the same place where the adhesive is dispensed thereon. The additive is stored in a reservoir or container 32 and spread on the fabric 14 in any well known manner. The fabric 12, and the nonwoven fabric 14 with the adhesive and additive spread thereon, are fed through guide rollers 34 toward bonding station 36. Bonding station 36 is adjusted such that the film 12 is brought in touching engagement to the fabric 14 without substantial pressure being applied to either the film 12 or the fabric 14. Since the adhesive preferably does not wet through the fabric 14, bonding takes place only on a small percentage of the fabric and film 12. Bonding station 36 is adjusted such that the film 12 is brought in touching engagement with the fabric 14 without substantial pressure being applied to either film 12 or the fabric 14. If the additive is mixed with the glue, the additive can be put in the adhesive up to 25% concentrations by weight without causing any substantial loss of adhesion or other properties. After passing through station 36, the material is wound on a roll 38.

Referring now to FIGS. 5 and 6, the material 10 is particularly suitable for protecting large articles such as a van 40 (FIG. 4) or a motorcycle 42 (FIG. 5). Other articles, such as lawn and garden equipment, boats, other recreational equipment, etc. are also suitable for wrapping with material 10 and treatment by an additive carried in the adhesive 16. The van 40 is wrapped in a bag 43 of the material 10. Heat is then applied to shrink the material against the van 40. As discussed above, as the material shrinks, nonwoven layer 14 aerates or expands, due to expansion of the air entrained in the voids defined by the fibers defining the nonwoven fabric, thus softening the material, protecting the vehicle 40 against articles such as stones that may be hurled against the vehicle during transport. Since the outer film 12 is impervious, the vehicle is also protected against environmental contaminants, such as acid rain. However, even under the best of circumstances, corrosion can take place on exposed, nonpainted metal parts of the van 40, particularly when the vehicle is shipped overseas or packaged/shrunk wet or with trapped moisture. Accordingly, the additive in the adhesive releases a constant vapor which settles on and protects the exposed metal part of the van 40. In FIG. 5, material 44 is wrapped around the motorcycle 42. Again, the motorcycle 42 includes many exposed, normally unpainted, metal parts. Consumers expect that expensive products be in pristine condition wherever received, even though the products may spend many months in storage and transport, particularly when exported overseas. Accordingly, the motorcycle 42 is protected by the vapor corrosion inhibitor carried in the adhesive.

Other equipment, such as electronic equipment, may be wrapped with the material 10, but with antistats, such as stat removers or static electric dissipators, added to the adhesive 16. Other products, such as surgical equipment, may be protected against contamination by anti-microbials carried in the adhesive layer 16. Fragrances may be added to the adhesive layers, so that when the packaging is cut away, a pleasant odor surrounds the product. Other types of additives, well known to those skilled in the art, may also be added to the adhesive. In any case, the vapor admitted by the additives is prevented from escaping into the ambient atmosphere by the film 12, the vapor readily passes through the open, expanded woven layer, since the fibers comprising the nonwoven material define large, air-filled voids which provide little resistance to passage of the vapor.

Referring now to FIG. 7, a carton indicated by the numeral 46 defines a cavity 48 for receiving a product (not shown). After the product is placed in the carton 46, the carton is sealed by folding inner flaps 50 inwardly, applying an adhesive 52 to the flaps 50, and then folding over the outer flaps 54 over the inner flaps 50 to thereby close the container 46. According to the invention, one of the aforementioned additives may be added to the adhesive 52, which releases into the cavity 48 to protect the product stored therein. It is noted that the cardboard or paperboard is air permeable and the flaps 50, when folded, define a gap permitting access of the additive into the cavity 48.

The invention can also be used with a tape material. Such tape materials are used to protect products during transit by applying a film to the surface of the product. Referring to FIG. 8, adhesive 56 containing an additive such as a vapor corrosion inhibitor is applied to one side of a film 58. The adhesive is used to adhere the film to a surface of the product to be protected, thereby protecting the product. The film may be any conventional film, including stretch films and shrink films. The adhesive may be any suitable adhesive well known to those skilled in the art, including hot melt adhesives. Since the film is impermeable to the vapor corrosion inhibitor, the tape may be wrapped around portions of an article where protection is desired, and the film does not allow the additives to escape into atmosphere. Accordingly, all of the additive is used to protect the product. Tape material is particularly useful in protecting machined portions of large articles. For example, many machined components have machined surfaces comprising only a portion of the total product. These surfaces must be protected against corrosion. Accordingly, the tape material may be wrapped around these machined surfaces so that the machined surfaces are protected. This is more cost effective than wrapping the entire article, when only a portion of the article corrosion protection necessary.

I claim:

1. Adhesive mixture comprising a block copolymer hot melt adhesive and a vapor releasing vapor corrosion inhibitor mixed with the block copolymer hot melt adhesive, said vapor corrosion inhibitor being in the form of particles suspended in said adhesive composition, said particles having a maximum dimension of less than about 30 microns.

2. Adhesive mixture as claimed in claim 1, wherein said vapor corrosion inhibitor is about 5% to about 20% by weight of the adhesive mixture.

3. Adhesive mixture as claimed in claim 1, wherein said block copolymer hot melt adhesive is a mixture of thermoplastic rubber, tackifiers, plasticizers and mineral oil.

4. Adhesive mixture for securing packaging components together and for delivering an additive to a product within a volume defined by the packaging components comprising a block copolymer hot melt adhesive and a vapor releasing vapor corrosion inhibitor mixed with the block copolymer hot melt adhesive, said vapor corrosion inhibitor being in the form of particles suspended in said adhesive composition, said particles having a maximum dimension of less than about 30 microns.

5. Adhesive mixture as claimed in claim 4, wherein said vapor corrosion inhibitor is about 5% to about 20% by weight of the adhesive mixture.

6. Adhesive mixture as claimed in claim 4, wherein said block copolymer hot melt adhesive is a mixture of thermoplastic rubber, tackifiers, plasticizers and mineral oil.

7. Method of manufacturing an adhesive mixture comprising the steps of reducing the particle size of the particles of a particulate vapor corrosion inhibitor to a maximum dimension of about 30 microns, and then mixing the vapor corrosion inhibitor with a block copolymer hot melt adhesive.

8. Method of manufacturing an adhesive mixture as claimed in claim 7, wherein said particles are placed in a chamber and cooled to a temperature at least sufficient to reduce the humidity in the chamber to a minimal amount before the particles are reduced in size.

9. Method of manufacturing an adhesive mixture as claimed in claim 7, wherein said particles are reduced in size by using a pressure jet to impel the particles against one another within a chamber and then classifying the particles out of the chamber after they reach a predetermined maximum size.

10. Method of manufacturing an adhesive mixture as claimed in claim 7, wherein said method includes the steps of combining thermoplastic rubber, tackifiers, plasticizers and mineral oil, reducing the mixture by heating, and blending in the particles of vapor corrosion inhibitors as the mixture is being reduced.

11. Method of manufacturing an adhesive mixture as claimed in claim 7, wherein said method includes the steps of combining thermoplastic rubber, tackifiers, plasticizers and mineral oil, and blending the particles of vapor corrosion inhibitors into the mineral oil before combining the mineral oil into the mixture.

* * * * *